United States Patent
Lundborg et al.

(10) Patent No.: US 9,203,573 B2
(45) Date of Patent: Dec. 1, 2015

(54) METHOD AND APPARATUS FOR CONTROLLING INTERFERENCE COORDINATION BETWEEN CELLS

(75) Inventors: Tomas Lundborg, Hässelby (SE); Ke Wang Helmersson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 37 days.

(21) Appl. No.: 14/125,526

(22) PCT Filed: Jun. 15, 2011

(86) PCT No.: PCT/SE2011/050736
§ 371 (c)(1),
(2), (4) Date: Dec. 11, 2013

(87) PCT Pub. No.: WO2012/173532
PCT Pub. Date: Dec. 20, 2012

(65) Prior Publication Data
US 2014/0370906 A1 Dec. 18, 2014

(51) Int. Cl.
*H04L 5/00* (2006.01)
*H04J 11/00* (2006.01)
*H04W 72/08* (2009.01)

(52) U.S. Cl.
CPC ........... *H04L 5/0032* (2013.01); *H04J 11/0053* (2013.01); *H04W 72/082* (2013.01)

(58) Field of Classification Search
CPC ..... H04W 72/08; H04W 24/02; H04W 24/08; H04L 5/0032
USPC .............. 455/452.1, 452.2, 63.1–63.2, 114.2, 455/269, 271, 278.1, 296, 500, 501, 550.1, 455/561
See application file for complete search history.

(56) References Cited

U.S. PATENT DOCUMENTS

2009/0201867 A1  8/2009  Teo et al.
2010/0056170 A1  3/2010  Lindoff et al.
(Continued)

FOREIGN PATENT DOCUMENTS

WO  WO 2010/002297      1/2010
WO  WO 2011/039066      4/2011
WO  WO 2011/051980 A1   5/2011

OTHER PUBLICATIONS

Extended European Search Report corresponding to International Application No. PCT/SE2011/050736, mailed Oct. 10, 2014, 10 pages.
(Continued)

*Primary Examiner* — Cong Tran
(74) *Attorney, Agent, or Firm* — Myers Bigel Sibley & Sajovec, P.A.

(57) ABSTRACT

A method and a base station serving a first cell of a cellular network, for controlling interference coordination with at least one neighboring cell. The base station obtains transaction related information pertaining to a forthcoming data transaction involving at least one wireless terminal in the first cell, and estimates a transaction magnitude (TM) for said data transaction, based on the obtained transaction related information. The base station then controls employment of an Inter-Cell Interference Coordination scheme for the forthcoming data transaction, based on the estimated transaction magnitude.

12 Claims, 2 Drawing Sheets

(56) References Cited

U.S. PATENT DOCUMENTS

| | | | |
|---|---|---|---|
| 2010/0254344 A1* | 10/2010 | Wei | H04W 16/10 370/330 |
| 2010/0317364 A1 | 12/2010 | Zhang et al. | |
| 2011/0003598 A1 | 1/2011 | Ma et al. | |
| 2011/0117967 A1* | 5/2011 | Vedantham | H04B 7/024 455/561 |
| 2011/0143793 A1 | 6/2011 | Kim | |
| 2011/0217985 A1* | 9/2011 | Gorokhov | 455/452.2 |
| 2013/0229971 A1* | 9/2013 | Siomina et al. | 370/312 |
| 2014/0128115 A1* | 5/2014 | Siomina et al. | 455/501 |
| 2014/0219117 A1* | 8/2014 | Meshkati et al. | 370/252 |

OTHER PUBLICATIONS

Frank et al: "Cooperative interference-aware joint scheduling for the 3GPP LTE uplink", Sep. 26, 2010, Personal Indoor and Mobile Radio Communications (PIMRC), 2010 IEEE 21$^{st}$ International Symposium on, IEEE, Piscataway, NJ, pp. 2216-2221.

International Search Report, PCT/SE2011/050736, Mar. 2, 2012.

Written Opinion of the International Searching Authority, PCT/SE2011/050736, Mar. 2, 2012.

G. Fodor et al.: "Intercell Interference Coordination in OFDMA Networks and in the 2GPP Long Term Evolution System," Journal of Communications, vol. 4, No. 7; Aug. 2009, pp. 445-453.

D. Kimura et al.: "De-Centralized Dynamic ICIC using X2 Interfaces for Downlink LTE Systems," Vehicular Technology Conference (VTC Spring), May 2011 IEEE 73$^{rd}$, vol., No., pp. 1-5, 15-18.

V. Pauli et al.: "Heterogeneous LTE Networks and Inter-Cell Interference Coordination", Nomor Research GmbH, Munich, Germany Dec. 2010 pp. 3-4.

"On the Impact of Inter-Cell Interference in LTE" Published by Ericsson AB, 8 pages, 2009.

* cited by examiner

METHOD AND APPARATUS FOR CONTROLLING INTERFERENCE COORDINATION BETWEEN CELLS

CROSS REFERENCE TO RELATED APPLICATION

This application is a 35 U.S.C. §371 national stage application of PCT International Application No. PCT/SE2011/050736, filed on 15 Jun. 2011, the disclosure and content of which is incorporated by reference herein in its entirety. The above-referenced PCT International Application was published in the English language as International Publication No. WO 2012/173532 A1 on 20 Dec. 2012.

TECHNICAL FIELD

The present disclosure relates generally to a method and an apparatus for controlling employment of an Inter-Cell Interference Coordination (ICIC) scheme in a first cell of a cellular network for wireless communication.

BACKGROUND

In cellular networks for wireless communication, interference may occur in a cell caused by signals transmitted in nearby located cells, which is a well-known problem. In such a network, the available radio bandwidth is limited and in order to provide capacity for communications in the network having multiple cells, resources pertaining to radio bandwidth must be reused in cells at a sufficient mutual distance so as to not disturb communication for one another. In this context, cells that are located near a serving cell are often referred to as "neighbouring cells" or "adjacent cells" and these terms will be used here in the sense that transmissions in neighbouring or adjacent cells may potentially disturb transmissions in the serving cell, and vice versa, thus causing interference. It should be noted that in this context a neighbouring or adjacent cell is not necessarily located right next to the serving cell but may be located one or more cells away, still causing interference.

The following description is relevant for cellular networks using e.g. any of the following radio access technologies: Orthogonal Frequency Division Multiplexing (OFDM), Single Carrier-Frequency Division Multiple Access (SC-FDMA), Orthogonal Frequency Division Multiple Access (OFDMA), Time Division Multiplex (TDM), Frequency Division Multiplex (FDM) and Code Division Multiple Access (CDMA).

A general problem in such cellular networks is that performance in radio communications will be degraded due to interference, e.g. when the same radio bandwidth is used simultaneously in multiple adjacent cells. This problem is typically more common for so-called cell edge terminals, i.e. terminals located close to the cell border and thus also close to neighbouring cells in the vicinity, as opposed to terminals located closer to the cell center and thus not as close to the neighbour cells. In order to address these interference related problems, various so-called Inter-Cell Interference Coordination (ICIC) schemes have been devised where transmissions in adjacent cells are coordinated amongst the cells such that simultaneous transmissions in the same radio bandwidth are avoided or at least restricted. Some examples of ICIC schemes are briefly outlined below.

A so-called High Interference Indicator (HII), referring to uplink resource allocations for cell edge terminals in a first cell, may be sent to the base stations of one or more neighbouring cells. The HII basically indicates that a certain set of uplink radio resources will be allocated to cell edge terminals in the first cell. As cell edge terminal are primarily affected by inter-cell interference, a neighbouring base station receiving the HII can thus avoid allocating radio resources from the same set to its own cell edge terminals.

A so-called Overload Indicator (OI), referring to uplink interference experienced in the first cell, may further be sent to the base stations of one or more neighbouring cells. The OI basically indicates that the current interference level on a certain set of radio resources exceeds a certain threshold in the first cell. In response thereto, a neighbouring base station can thus reduce the interference from the neighbouring cell in the first cell by allocating a different set of resources to its own terminals, or by allocating the interference generating set of resources only to terminals close to the cell center and not to cell edge terminals. The HII can be seen as a proactive ICIC scheme while the OI is a reactive one. Further, the HII and the OI can be exchanged between base stations on the well-known X2 interface, if used such as in Long Term Evolution (LTE) networks.

Further existing ICIC schemes include exchanging a so-called Relatively Narrow band Transmission Power Indicator (RNTPI) referring to restrictions in downlink power, between neighbouring base stations. The RNTPI implies restrictions of transmission power in a certain part of the used radio bandwidth. A base station receiving this indicator may thus allocate radio resources for downlink transmissions within this band and restrict the transmit power accordingly.

The above ICIC schemes rely on information exchanged between base stations, e.g. on the X2 interface. Other ICIC schemes are autonomous in the sense that decisions regarding resource allocation and transmit power are taken internally within the base station without relying on information provided from base stations in neighbouring cells. For example, a scheme called Fractional Frequency Reuse (FFR) can be applied, at least for cell edge terminals, amongst a predetermined set of neighbouring cells such that a certain frequency band is used by the cells in turn, i.e. without overlapping with one another in time.

Other autonomous ICIC schemes include Start Index and Random Start Index which a cell can apply in coordination with a predetermined set of neighbouring cells. In the Start Index scheme, resource allocations within a cell start from a given Physical Resource Block (PRB) index and follow a given direction of a predefined PRB sequence so as to avoid or at least reduce transmission overlaps between the cells. The resource allocations can also be done within opposite PRB sequence directions, referred to as bidirectional Start Index. The Random Start Index scheme is similar to the Start Index, apart from that resource allocations within a cell start from a random PRB index.

The above ICIC schemes entail various restrictions in the usage of radio resources to limit the effects of interference between cells. However, these restrictions of radio resource usage also result in reduced capacity as compared to when all available radio resources can be used for communications in the cell. It is therefore a problem that the above ICIC schemes and others are sometimes employed without much effect on the interference between cells, while still significantly reducing capacity in the cells. Other drawbacks with employing an ICIC scheme to no avail is that it requires some amount of processing and communication over the link between base stations, e.g. the X2 interface, for achieving the coordination between cells, and it may also delay the scheduling and transmission of data resulting in deteriorated radio communication.

On the other hand, it could be quite helpful to use a suitable ICIC scheme when really effective to combat interference such that the use of radio bandwidth among neighbouring cells can be improved to achieve the greatest possible capacity in the network. A problem is therefore to know whether the net effect of using an ICIC scheme is potentially helpful or not for reducing inter-cell interference.

SUMMARY

It is an object of the invention to address at least some of the problems and issues outlined above. It is possible to achieve these objects and others by using a method and an apparatus as defined in the attached independent claims.

According to one aspect, a method is provided in a base station serving a first cell of a cellular network, for controlling interference coordination with at least one neighbouring cell. In this method, the base station obtains transaction related information pertaining to a forthcoming data transaction involving at least one wireless terminal in the first cell. The base station then estimates a transaction magnitude for the forthcoming data transaction, based on the obtained transaction related information, and controls employment of an ICIC scheme for the forthcoming data transaction, based on the estimated transaction magnitude.

According to another aspect, a base station is provided which serves a first cell of a cellular network and being configured to control interference coordination with at least one neighbouring cell. The base station comprises an obtaining unit adapted to obtain transaction related information pertaining to a forthcoming data transaction involving at least one wireless terminal in the first cell. The base station further comprises an estimating unit adapted to estimate a transaction magnitude for the forthcoming data transaction, based on the obtained transaction related information, and a controlling unit adapted to control employment of an ICIC scheme for the forthcoming data transaction, based on the estimated transaction magnitude.

By using the above method and/or base station, an ICIC scheme can be employed selectively for a data transaction only when expected to be effective and helpful depending on the magnitude of the data transaction, e.g. when the gain more or less outweighs the cost for employing the ICIC scheme. It is also possible to avoid employment of ICIC scheme(s) and resulting use of processing resources to no avail.

The above method and arrangement may be implemented according to different optional embodiments. In one possible embodiment, controlling employment of the ICIC scheme includes employing the ICIC scheme when the estimated transaction magnitude fulfils a predefined trigger condition which may dictate that the ICIC scheme is employed if the estimated transaction magnitude exceeds a preset threshold. In further possible embodiments, the predefined trigger condition may be selected based on a current traffic load in the first cell, and/or based on the terminal's position in the first cell.

The estimated transaction magnitude may include at least one of an estimated amount of data and an estimated duration for the forthcoming data transaction. Further, the obtained transaction related information may include at least one of:
 an amount of data in a buffer in the base station to be transmitted from the base station to the at least one wireless terminal,
 a buffer status report indicating a buffered amount of data to be transmitted from the at least one wireless terminal,
 a channel quality indicator (CQI) valid for the forthcoming data transaction,
 data stream characteristics (Ch) derived from Deep Packet Inspection of data to be transmitted in the forthcoming data transaction, and
 a Quality-of-Service (QoS) class assigned to the forthcoming data transaction by a core network.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Figure 1:
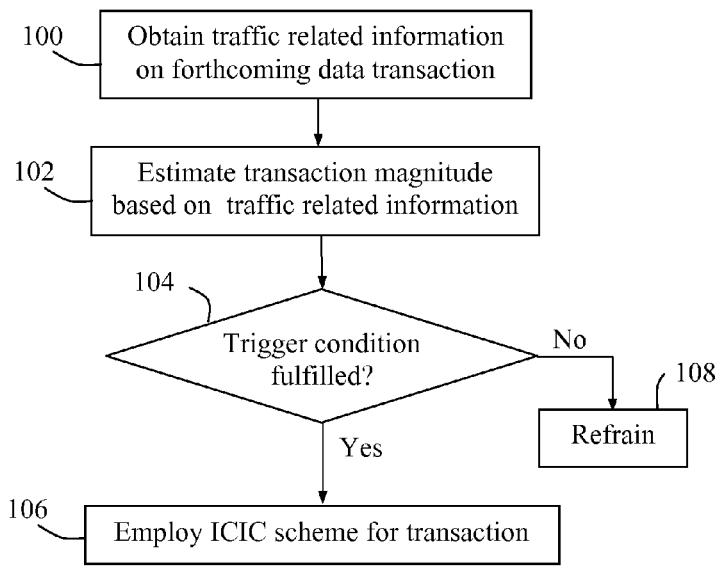
FIG. 1 is a flow chart illustrating a procedure for controlling employment of interference coordination, according to a possible embodiment.

Briefly described, a solution is provided to enable efficient or helpful use of ICIC schemes for reducing interference between neighbouring or adjacent cells. In particular, this solution can be used for finding out whether there will potentially be a net gain or not if an ICIC scheme is employed for reducing interference in a particular forthcoming data transaction. If not, it is deemed better to refrain from employing the ICIC scheme since it is also associated with certain costs in terms of reduced capacity, processing and delays, as described above. In this way, it is possible to employ an ICIC scheme for the data transaction only when really helpful, i.e. when the resulting gain is deemed greater than the cost, and to avoid it basically when the cost for employing the ICIC scheme is deemed to outweigh the gain of interference reduction caused by the ICIC scheme.

The solution may be implemented as a method and/or an apparatus in a base station serving a first cell of a cellular network, for controlling interference coordination with at least one neighbouring cell served by at least one other base station. In this disclosure, "controlling interference coordination" particularly refers to a decision as to whether transmissions in neighbouring cells should be coordinated amongst at least two such cells or not, i.e. whether an ICIC scheme will be activated and employed or not for a data transaction involving at least one wireless terminal in the first cell.

Employing an ICIC scheme may entail using one or more of the above-described ICIC scheme examples for a data transaction in the first cell, although this solution is not limited only to these examples. Further, the term "data transaction" is used here to represent any session or data communication that can be basically foreseen, and regardless of which communication protocol is used. Some example protocols for a data transaction include, without limitation on this solution, the well-known Transport Control Protocol (TCP) and the User Datagram Protocol (UDP), both running on the Internet Protocol (IP).

With reference to the flow chart in FIG. 1, the solution will now be described in terms of actions executed in a base station serving a first cell of a cellular network. It is assumed that a forthcoming data transaction, involving radio communication in either uplink or downlink with at least one wireless terminal in the first cell, can be detected by the base station. For example, data may be received that is destined to the terminal, or the terminal may request to send data.

This solution makes use of an estimation of the data transaction with respect to its length or duration and/or the amount of data, i.e. "size", to be communicated, which will hereafter be jointly denoted a "transaction magnitude". In this disclosure, transaction magnitude may thus include at least one of an amount of data and an expected duration of the data transaction, assuming that these parameters can be reasonably estimated for a forthcoming data transaction. A predefined threshold condition for the transaction magnitude governs the employment of an ICIC scheme for the data transaction, which will be described in more detail below.

In a first shown action 100, the base station obtains transaction related information which pertains to the forthcoming data transaction involving the at least one wireless terminal in the first cell. In this context, the transaction related information may comprise at least one of the examples A-E outlined below, without limiting the solution.

A) The "size" or amount of data in a buffer in the base station, e.g. the number of bits, the buffer thus containing buffered data to be transmitted from the base station to the at least one wireless terminal. Typically, data to be transmitted in a data transaction on the downlink to a wireless terminal is received from a core network serving the cellular network, which data is accumulated in the buffer before or when the transmission is scheduled and commenced. The base station may thus be able to determine and use the buffered data amount, sometimes referred to as the "buffer size", as the above transaction related information in this solution.

B) A buffer status report indicating a buffered data amount to be transmitted from the at least one wireless terminal. In a similar manner, data to be transmitted in a data transaction on the uplink from a wireless terminal is typically accumulated in a local buffer in the terminal, before being transmitted. The wireless terminal may thus be able to determine the amount of data in its buffer and send this information in a buffer status report to the base station, which information can be used by the base station e.g. for scheduling purposes. For this solution, the amount of data in the buffer reported by the terminal can be utilized as the above transaction related information.

C) A Channel Quality Indicator, CQI, valid for the forthcoming data transaction, or other parameter indicating channel quality. This type of parameter is already used today for various purposes, e.g., for determining certain features for the forthcoming data transaction such as modulation and coding schemes, transmit power, etc. In this solution, the CQI may be used when estimating the duration for the data transaction, e.g. since an expected data throughput is dependent of the CQI and the duration can be determined from a known data amount.

D) Data stream characteristics which can be derived from Deep Packet Inspection, DPI, of data to be transmitted in the forthcoming data transaction. The data stream characteristics may likewise be used when estimating the duration for the data transaction. DPI basically means that the content of a data packet is analyzed for determining various parameters of the packet such as data stream characteristics. DPI is a well-known procedure not necessary to describe as such here in any detail to understand this embodiment. For example, by recognizing a pattern in the data it may be deduced that the transaction will be of relatively long duration, or a packet header flag may be detected that indicates the end of transaction. Peer-to-Peer traffic may also be detected which normally involves very short data fragments, and so forth.

E) A Quality-of-Service (QoS) class, e.g. the so-called Traffic Handling Priority (THP) class, assigned to the forthcoming data transaction by the core network serving the cellular network. The QoS parameter can influence the duration for the data transaction in the sense that a high QoS class implies faster transmission and shorter transaction time, while a low QoS class implies relatively slower transmission and longer transaction duration. In this solution, the QoS may thus be used as well when estimating the duration for the data transaction.

Returning to FIG. 1, a next action 102 indicates that the base station estimates the transaction magnitude for the forthcoming data transaction based on the obtained transaction related information. In this context, the transaction magnitude may include an estimated amount of data to be transmitted in the data transaction, or an estimated duration for the data transaction, or a combination of both which will be described in more detail later below. Thereby, the base station is able to use the estimated transaction magnitude as a basis for controlling employment of an ICIC scheme for the forthcoming data transaction.

In this example, the base station determines whether the estimated transaction magnitude fulfils a predefined trigger condition, in a following action 104. The trigger condition may have been defined to dictate that the ICIC scheme should be employed if the estimated transaction magnitude, i.e. the estimated data amount or transaction duration or a combination thereof, exceeds a preset threshold.

If the base station determines in action 104 that the estimated transaction magnitude fulfils the trigger condition, the ICIC scheme is employed in an action 106. On the other hand, if the estimated transaction magnitude does not fulfill the trigger condition, the base station refrains from employing the ICIC scheme in an alternative action 108. In other words, it is not deemed worthwhile to employ the ICIC scheme in the latter case for this particular data transaction since the estimated transaction magnitude is too small, implying that the gain of the ICIC scheme will not sufficiently outweigh its cost.

The above-described procedure can be adapted in different ways, For example, the predefined trigger condition may be selected based on a current traffic load in the first cell. If the traffic load is high in the cell, e.g. above a preset limit, the trigger threshold may be set relatively low, and if the traffic load is low, the trigger threshold may be set higher, assuming that employing the ICIC scheme may be helpful or necessary particularly during dense traffic even for relatively small-sized and/or short-lived data transactions, but may not be so effective during low traffic when the general level of interference in the cells is quite low anyway. The predefined trigger condition may also be selected based on the terminal's position in the first cell such that the trigger threshold is set relatively low for a terminal located in a border area of the cell, thus potentially causing interference in a neighbouring cell, and relatively high for a terminal located in a center area of the cell with less risk for causing interference in a neighbouring cell.

Figure 2:
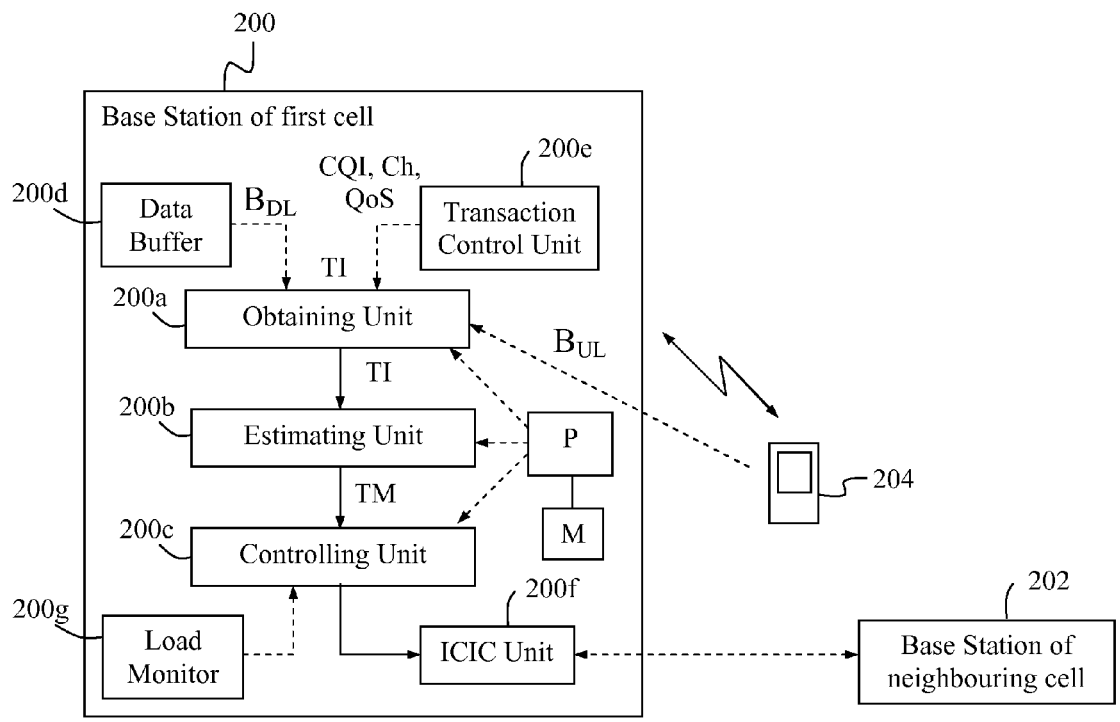
FIG. 2 is a block diagram illustrating functional units in a base station, according to some possible embodiments.

A detailed but non-limiting example of how a base station can be configured to accomplish the above-described solution, is illustrated by the block diagram in FIG. 2. The base station 200 serves a first cell of a cellular network, not shown, and the base station 200 is configured to control interference coordination with at least one neighbouring cell served by a base station 202 by means of an ICIC scheme, e.g. in the manner described above for FIG. 1.

The base station 200 comprises an obtaining unit 200a adapted to obtain transaction related information, "TI", pertaining to a forthcoming data transaction involving at least one wireless terminal 204 in the first cell, e.g. as described for action 100 above. The base station 200 also comprises an estimating unit 200b adapted to estimate a transaction magnitude "TM" for the forthcoming data transaction, based on the obtained transaction related information TI, e.g. as described for action 102 above. The base station 200 further comprises a controlling unit 200c adapted to control employment of an ICIC scheme for the forthcoming data transaction, based on the estimated transaction magnitude TM, e.g. as described for actions 104-108 above. The controlling unit 200c may in this regard send control signals as instructions to an ICIC unit 200f which is configured to employ the ICIC scheme accordingly in cooperation with the shown neighbouring base station 202, if required.

It should be noted that FIG. 2 merely illustrates various functional units or entities in the base station 200 in a logical sense, although the skilled person is able to implement these functions in practice using suitable software and hardware means. Thus, this aspect of the solution is generally not limited to the shown structures of the base station 200, and the functional units 200a-c may be configured to operate according to the features described for FIG. 1 above and FIGS. 3 and 4 below, where appropriate.

The functional units 200a-c described above can be implemented in the base station 200 as program modules of a respective computer program comprising code means which, when run by a processor "P" causes the base station to perform the above-described actions. The processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in the base station 200 in the form of a memory "M" connected to the processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the base station 200.

The above base station 200 and its functional units 200a-200c may be configured or adapted to operate according to various optional embodiments. In some possible embodiments, the transaction related information obtained by the obtaining unit 200a may include at least one of the following examples A-E:

A) The amount of data in a buffer 200d in the base station to be transmitted on the downlink (DL) from the base station 200 to the at least one wireless terminal 204, the buffered data amount being denoted "$B_{DL}$" in FIG. 2.

B) A buffer status report indicating a buffered data amount to be transmitted on the uplink (UL) from the at least one wireless terminal 204, the buffered data amount in the buffer status report being denoted "$B_{UL}$" in FIG. 2.

C) A channel quality indicator, denoted "CQI" in FIG. 2, valid for the forthcoming data transaction, which can typically be obtained from a transaction control unit 200e or similar function, configured in the base station for determining various communication parameters and schemes for data transactions.

D) Data stream characteristics, denoted "Ch" in FIG. 2, e.g. derived from Deep Packet Inspection of data to be transmitted on the downlink in the forthcoming data transaction, which may likewise be obtained from the transaction control unit 200e.

E) A Quality-of-Service class, denoted "QoS" in the figure, that has been assigned to the forthcoming data transaction by a core network, which may likewise be obtained from the transaction control unit 200e.

The above examples A-E of transaction related information were also described in more detail above in connection with FIG. 1.

As also mentioned above, the transaction magnitude may include an estimated amount of data or an estimated duration for the data transaction, or a combination of both. In another possible embodiment, the controlling unit 200c may be further adapted to control the employment of the ICIC scheme by employing the ICIC scheme when the estimated transaction magnitude fulfils a predefined trigger condition. Further, the predefined trigger condition may dictate that the ICIC scheme is employed if the estimated transaction magnitude exceeds a preset threshold.

Figure 3:
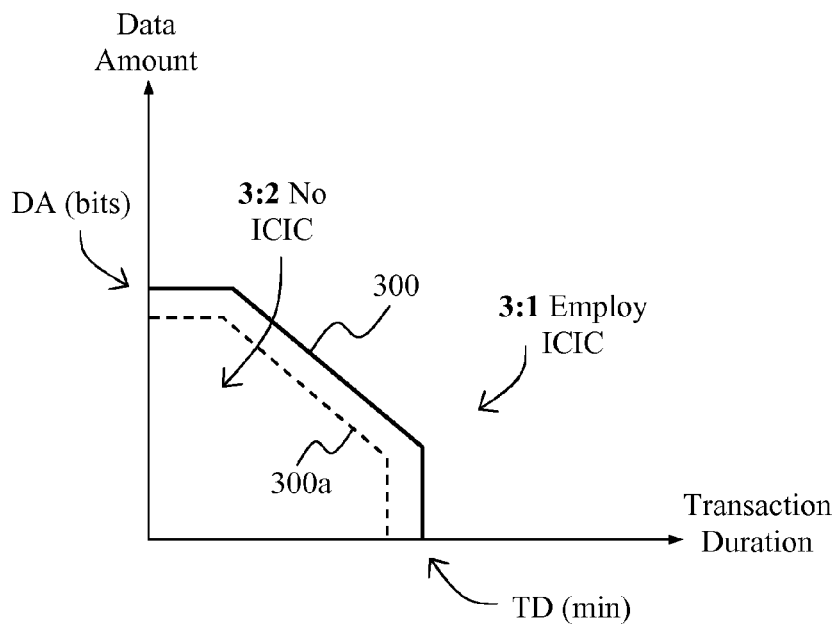
FIG. 3 is a diagram illustrating a threshold condition for employing an ICIC scheme, according to a possible embodiment.

In this context, reference is made to the diagram of FIG. 3 which illustrates a predefined trigger condition as a threshold 300 that pertains to a combination of data amount "DA" and transaction duration "TD" for the data transaction. The trigger condition defined by threshold 300 thus dictates that the ICIC scheme should be employed if the estimated combination of data amount and transaction duration, which can be represented by a position or point in the diagram, exceeds the threshold 300 shown as a position 3:1, but not if the combination falls below the threshold 300 shown as a position 3:2.

In another possible embodiment, the controlling unit 200c may be further adapted to select the predefined trigger condition based on a current traffic load in the first cell, which may be obtained from a load monitor 200g in the base station 200. In FIG. 3, this is illustrated as an alternative threshold 300a in the select trigger condition allowing for employment of ICIC scheme for "smaller" or shorter data transactions e.g. when the traffic load is relatively high, or higher than a preset limit. The controlling unit 200c may be further adapted to select the predefined trigger condition based on the terminal's position in the first cell.

Figure 4:
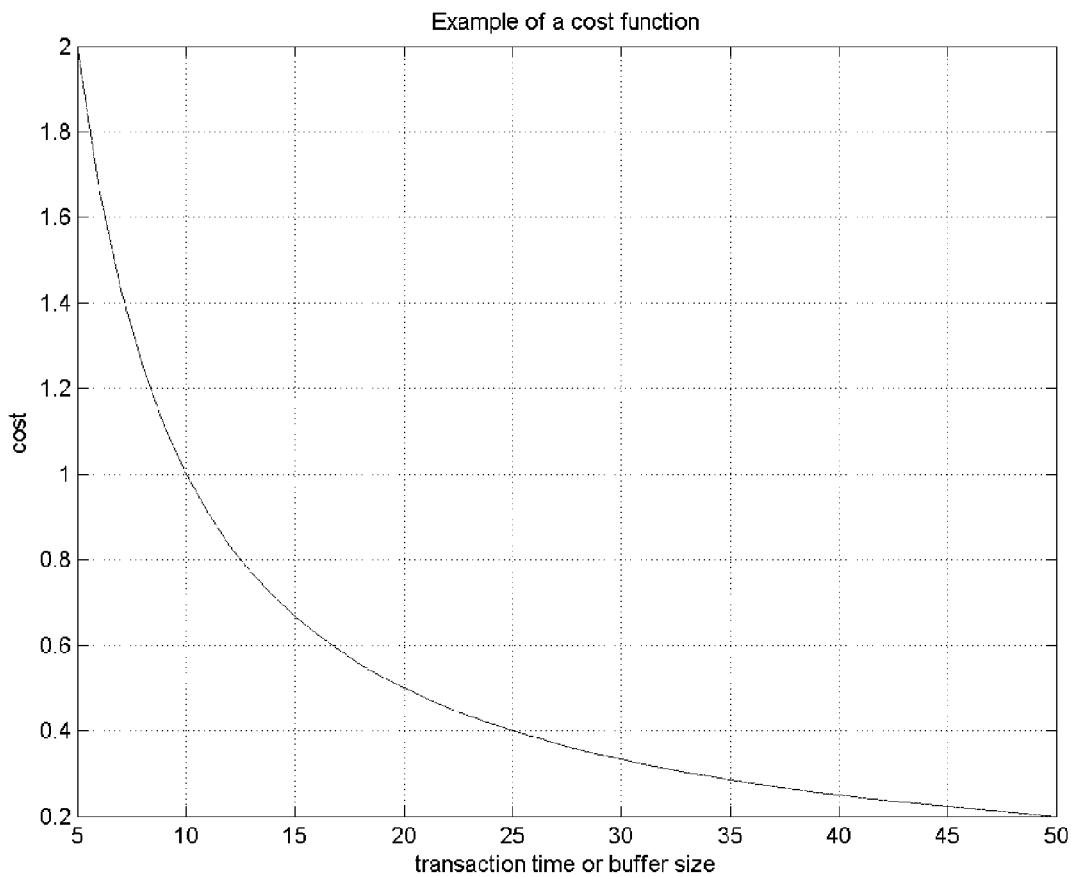
FIG. 4 is a diagram illustrating a cost function for employing an ICIC scheme, according to another possible embodiment.

The diagram in FIG. 4 illustrates that the cost for employing an ICIC scheme can be set as a function of transaction magnitude expressed as transaction duration or amount of buffered data, which may also be referred to as "buffer size" or "buffer level", either in the base station or in the terminal. In this diagram, a threshold for employing an ICIC scheme may be set as a cost limit, e.g. the cost should not exceed "1", which can be translated into a minimum limit for the transaction magnitude, in this case being "10" according to the cost function. Expressed differently, the ICIC scheme will be employed for a forthcoming data transaction if the transaction magnitude of the transaction exceeds 10. If the cost limit is selected to be "0,4" in another example case, e.g. when the traffic load is lower than a preset limit, the minimum limit for the transaction magnitude should be raised to "25" according to the cost function, and so forth.

When using the solution according to any of the above-described embodiments, it is an advantage that it enables employment of one or more ICIC schemes selectively for data transactions when it is really effective and helpful, but not for other data transactions, depending on the magnitude of the data transaction e.g. in terms of data amount and/or transaction duration. Thereby, it can be avoided to employ ICIC scheme(s) unnecessarily and to use processing resources to no avail. Further, any detrimental scheduling delays caused by ICIC activities can also be avoided unless the ICIC activities are deemed to provide a gain outweighing the cost, i.e. a net gain.

While the invention has been described with reference to specific exemplary embodiments, the description is generally only intended to illustrate the inventive concept and should not be taken as limiting the scope of the invention. For example, the terms "base station", "cellular network", "wireless terminal", "transaction related information", "transaction magnitude", "ICIC scheme" and "trigger condition" have been used throughout this description, although any other corresponding nodes, functions, and/or parameters could also be used having the features and characteristics described here. The invention is defined by the appended claims.

What is claimed is:

1. A method in a base station serving a first cell of a cellular network, for controlling interference coordination with at least one neighbouring cell, the method comprising:
   obtaining transaction related information (TI) pertaining to a forthcoming data transaction involving at least one wireless terminal in the first cell,
   estimating a transaction magnitude (TM) for said forthcoming data transaction, based on the obtained transaction related information, and
   controlling employment of an Inter-Cell Interference Coordination (ICIC) scheme for the forthcoming data transaction, based on the estimated transaction magnitude,
   wherein the estimated transaction magnitude includes at least one of an estimated amount of data and an estimated duration for the forthcoming data transaction.

2. A method according to claim 1, wherein controlling employment of the ICIC scheme includes employing the ICIC scheme when the estimated transaction magnitude fulfils a predefined trigger condition.

3. A method according to claim 2, wherein the predefined trigger condition dictates that the ICIC scheme is employed if the estimated transaction magnitude exceeds a preset threshold.

4. A method according to claim 2, wherein the predefined trigger condition is selected based on a current traffic load in the first cell.

5. A method according to claim 2, wherein the predefined trigger condition is selected based on the terminal's position in the first cell.

6. A method according to claim 1, wherein the obtained transaction related information includes at least one of:
   an amount of data in a buffer in the base station to be transmitted from the base station to the at least one wireless terminal,
   a buffer status report indicating a buffered amount of data to be transmitted from the at least one wireless terminal,
   a channel quality indicator (CQI) valid for the forthcoming data transaction,
   data stream characteristics (Ch) derived from Deep Packet Inspection of data to be transmitted in the forthcoming data transaction, and
   a Quality-of-Service (QoS) class assigned to the forthcoming data transaction by a core network.

7. A base station serving a first cell of a cellular network and being configured to control interference coordination with at least one neighbouring cell, the base station comprising:
   an obtaining unit adapted to obtain transaction related information pertaining to a forthcoming data transaction involving at least one wireless terminal in the first cell,
   an estimating unit adapted to estimate a transaction magnitude (TM) for the forthcoming data transaction, based on the obtained transaction related information, and
   a controlling unit adapted to control employment of an Inter-Cell Interference Coordination (ICIC) scheme for the forthcoming data transaction, based on the estimated transaction magnitude,
   wherein the estimated transaction magnitude includes at least one of an estimated amount of data and an estimated duration for the forthcoming data transaction.

8. A base station according to claim 7, wherein the controlling unit is further adapted to control the employment of the ICIC scheme by employing the ICIC scheme when the estimated transaction magnitude fulfils a predefined trigger condition.

9. A base station according to claim 8, wherein the predefined trigger condition dictates that the ICIC scheme is employed if the estimated transaction magnitude exceeds a preset threshold.

10. A base station according to claim 8, wherein the controlling unit is further adapted to select the predefined trigger condition based on a current traffic load in the first cell.

11. A base station according to claim 8, wherein the controlling unit is further adapted to select the predefined trigger condition based on the terminal's position in the first cell.

12. A base station according to claim 7, wherein the obtained transaction related information includes at least one of:
   an amount of data in a buffer in the base station to be transmitted from the base station to the at least one wireless terminal,
   a buffer status report indicating a buffered amount of data to be transmitted from the at least one wireless terminal,
   a channel quality indicator (CQI) valid for the forthcoming data transaction,
   data stream characteristics (Ch) derived from Deep Packet Inspection of data to be transmitted in the forthcoming data transaction, and
   a Quality-of-Service (QoS) class assigned to the forthcoming data transaction by a core network.

* * * * *